(12) United States Patent
Bradshaw

(10) Patent No.: US 6,890,631 B2
(45) Date of Patent: May 10, 2005

(54) DUAL-SURFACE FLEXIBLE MAGNETIC TAPE

(75) Inventor: Richard Lionel Bradshaw, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 207 days.

(21) Appl. No.: 10/167,155

(22) Filed: Jun. 10, 2002

(65) Prior Publication Data
US 2003/0228498 A1 Dec. 11, 2003

(51) Int. Cl.[7] .............................................. G11B 5/718
(52) U.S. Cl. .................. 428/212; 428/213; 428/323; 428/328; 428/694 BM; 360/132
(58) Field of Search .......................... 428/212, 213, 428/323, 328, 694 BM, 336; 360/132

(56) References Cited

U.S. PATENT DOCUMENTS

| | | | |
|---|---|---|---|
| 3,725,611 A | 4/1973 | Smaller ................ | 179/100.2 A |
| 4,075,384 A | 2/1978 | Suzuki et al. ................ | 428/212 |
| 4,200,678 A | 4/1980 | Pister et al. ................. | 428/329 |
| 4,423,454 A | 12/1983 | Felleisen et al. ............ | 360/135 |
| 5,849,386 A | 12/1998 | Lal et al. | |
| 5,850,328 A | 12/1998 | Leonhardt et al. .......... | 360/134 |
| 6,194,058 B1 * | 2/2001 | Isobe et al. .................. | 428/216 |
| 6,231,963 B1 | 5/2001 | Lehner et al. .............. | 428/323 |

FOREIGN PATENT DOCUMENTS

| | | |
|---|---|---|
| EP | 0064129 A1 | 11/1982 |
| EP | 1073041 A1 | 1/2001 |
| JP | 54050304 A | 4/1979 |
| JP | 59186123 | 10/1984 |
| JP | 4113510 | 4/1992 |
| JP | 4163715 | 6/1992 |
| JP | 5028468 | 2/1993 |
| JP | 5041844 A | 2/1993 |
| JP | 7130126 | 5/1995 |

* cited by examiner

Primary Examiner—Stevan A. Resan
(74) Attorney, Agent, or Firm—Antonio R. Durando; Quarles & Brady Streich Lang LLP

(57) ABSTRACT

A flexible magnetic-tape substrate is coated on both sides with an underlayer of relatively-low coercivity magnetic medium, which in turn is coated with a submicron layer of chromium dioxide in ultra small particles having a high coercivity. For longitudinal magnetic recording systems, magnetic layers with a coercivity of at least 1,500 Oe with underlayers having a coercivity between 25 and 500 Oe are used. For helical magnetic recording systems, magnetic layers with a coercivity of at least 2,000 Oe with underlayers having a coercivity between 25 and 800 Oe are used. These properties greatly reduce the effects of neighboring magnetic fields, thereby improving signal retention and virtually eliminating print-through and contact recording.

26 Claims, 2 Drawing Sheets

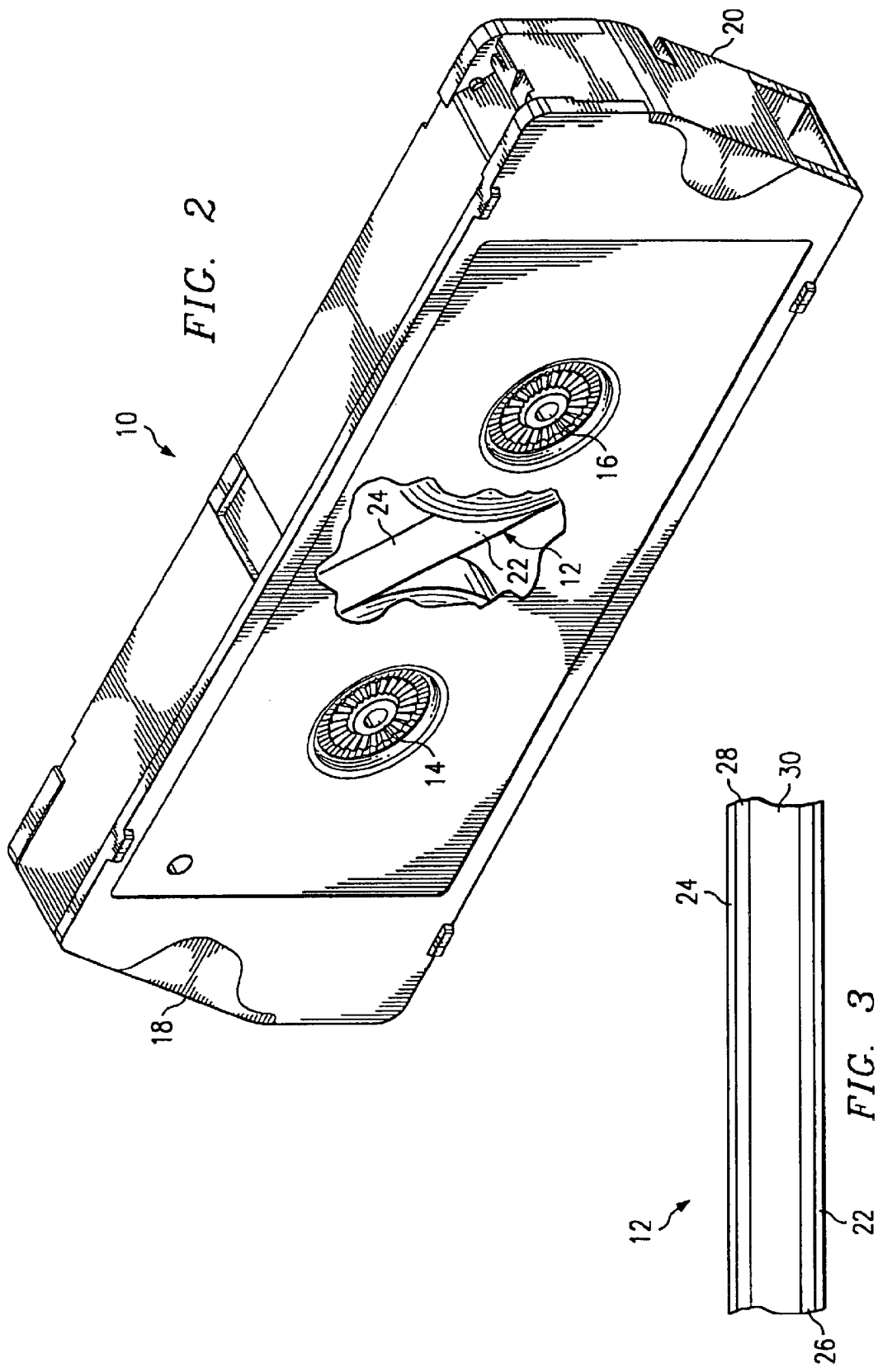

DUAL-SURFACE FLEXIBLE MAGNETIC TAPE

BACKGROUND OF THE INVENTION

1. Field of the Invention

This invention relates to magnetic media for recording and, in particular, to a flexible tape with dual magnetic surfaces.

2. Description of the Related Art

With the ever increasing demand for miniaturization, greater recording speed, and larger storage capacity, it has been a long-term objective of the magnetic recording industry to be able to record magnetic information on both surfaces of the magnetic medium of interest. That goal has been accomplished satisfactorily with disks, but is has been difficult to implement it with flexible-tape magnetic media. A problem for wound spools of tape, as compared to disks, arises from the very thin substrate used to separate the magnetic layers, which allows what in the art is referred to as a "print-through" or "ghost" imaging of the data pattern from one surface onto the opposite surface of the tape. This condition results from magnetic flux lines passing through the recording layer and the substrate during the recording process with sufficient strength to also record a poorly resolved signal on the magnetic coating on the opposite side of the tape. The use of a thicker tape substrate reduces print-through, but it also reduces the volumetric storage capacity of the tape. Thus, the art is evolving in the direction of ever thinner tapes and thinner recording layers (typically less than 0.4 microns).

In the recording process, a strong magnetic field is preferably applied to a very shallow depth in order to minimize penetration of the field flux through the substrate and, if present, through the coating on the opposite side of the tape. A useful tool for improving the effects of a strong magnetic field past the recording layer has been the use of a weak magnetic underlayer as a "keeper" or shunt for the field, thereby preventing signal penetration. Several patents have disclosed this approach to improve signal performance in the magnetic layer of thin-substrate tapes. See, for example, U.S. Pat. Nos. 4,109,046, No. 4,423,454, No. 4,200,678, and No. 4,075,384. None of these patents, though, addressed the use of weak magnetic underlayers to enable dual-surface recording.

Another problem for spools of dual-surface tape lies in the fact that the two magnetized layers are placed in close proximity to one another when the two surfaces of the tape are spooled into a wound pack of tape. As a result of the winding process, the magnetic medium on one side of the tape is necessarily placed physically against the magnetic medium on the other side found from the previous wrap of the tape on the reel. This condition produces what in the art is referred to as "contact recording"; that is, imaging of the data pattern on one surface onto the opposite surface of the tape. Moreover, when two recording surfaces are placed in direct contact with one another, errant magnetization on either side of the tape may also result.

Various implementations of dual-surface magnetic tapes are described in the prior art, such as in Japanese Patents No. JP54050304, No. JP4163715, and No. JP5041844, but none of these inventions addressed the print-through and contact-recording problems described above. Other prior-art disclosures described inventions directed at improving the performance of double-sided magnetic tapes. For example, U.S. Pat. No. 3,725,611 describes a double-coated magnetic tape where the two ferromagnetic layers on opposite sides of the tape have different thicknesses designed to improve the recording efficiency of short and long wavelength signals from a master tape. Since both sides of the tape are utilized for a single recording operation, though, this invention does not improve the storage capacity of the medium.

Similarly, U.S. Pat. No. 5,850,328 describes a two-sided magnetic recording tape where the magnetic particles are aligned in differing magnetic orientation during the manufacturing process. The magnetic orientation of each side is of sufficient angular displacement with respect to the other side to minimize the effects of contact recording and print-through. The invention requires the use of special read/write heads in azimuth alignment with the tape.

Because of the mentioned special requirements and shortcomings, none of the solutions heretofore described in the prior art has gained commercial acceptance. Nonetheless, as tape thickness is progressively reduced to afford more storage capacity, the use of double-sided tape has become an ever attractive objective and there is still a need for a practical implementation of the dual-surface magnetic-tape concept. This invention provides a simple solution based on the discovery of new combinations of properties in the magnetic and substrate layers that are particularly suitable for dual application with thin-film tape substrates.

BRIEF SUMMARY OF THE INVENTION

The primary objective of this invention is a dual-surface, flexible, magnetic tape for double-side use free of print-through and errant magnetization caused by contact recording.

Another objective of the invention is a solution to the problems of print-through and contact recording which can be implemented without the use of specialized read/write equipment.

Another goal is an invention that is suitable for relatively simple implementation in all types of flexible magnetic-recording media.

Still another goal is an invention that can be carried out advantageously without material modification to existing manufacturing processes and equipment.

A final objective is an approach that can be implemented easily and economically according to the above stated criteria.

Therefore, according to these and other objectives, the invention consists of providing a high-coercivity magnetic recording layer over a relatively low-coercivity underlayer on each side of an intermediate substrate. Depending on the type of recording system involved, the specific coercivity values of the layers are judiciously selected consistent with this constraint such as to minimize print-through and contact recording. For longitudinal magnetic recording systems (also known in the art as linear systems), these desired results can be obtained by combining magnetic layers with a coercivity of at least 1,500 Oe with underlayers having a coercivity between 25 and 500 Oe. For helical magnetic recording systems, these desired effects can be obtained by combining magnetic layers with a coercivity of at least 2,000 Oe with underlayers having a coercivity between 25 and 800 Oe.

Although not critical, particle orientation has also been found to be a useful parameter for implementing the objectives of the invention when combined with the coercivity specifications disclosed above. For example, in linear systems the particle orientation should always be greater in the recording layers than in the underlayers, with values preferably greater than about 1.5:1 OR (orientation ratio) in the recording layers and less than about 2.0:1 OR in the underlayers. In helical systems, the particle orientation should be as low as possible in both types of layers, preferably lower than about 1.5:1 OR. These combinations of particle orientation and coercivity parameters enabled the successful implementation of dual-surface flexible magnetic tapes having recording layers less than 0.25 μm thick over underlayers about twice as thick.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only some of the various ways in which the invention may be practiced.

BRIEF DESCRIPTION OF THE DRAWINGS

FIG. 2 is a partially cut-out view of the cartridge of FIG. 1 to illustrate the double-sided tape of the invention.

FIG. 3 is a schematic view of the various layers and underlayers that form the double-sided tape of the invention.

DESCRIPTION OF THE PREFERRED EMBODIMENTS OF THE INVENTION

Figure 1:
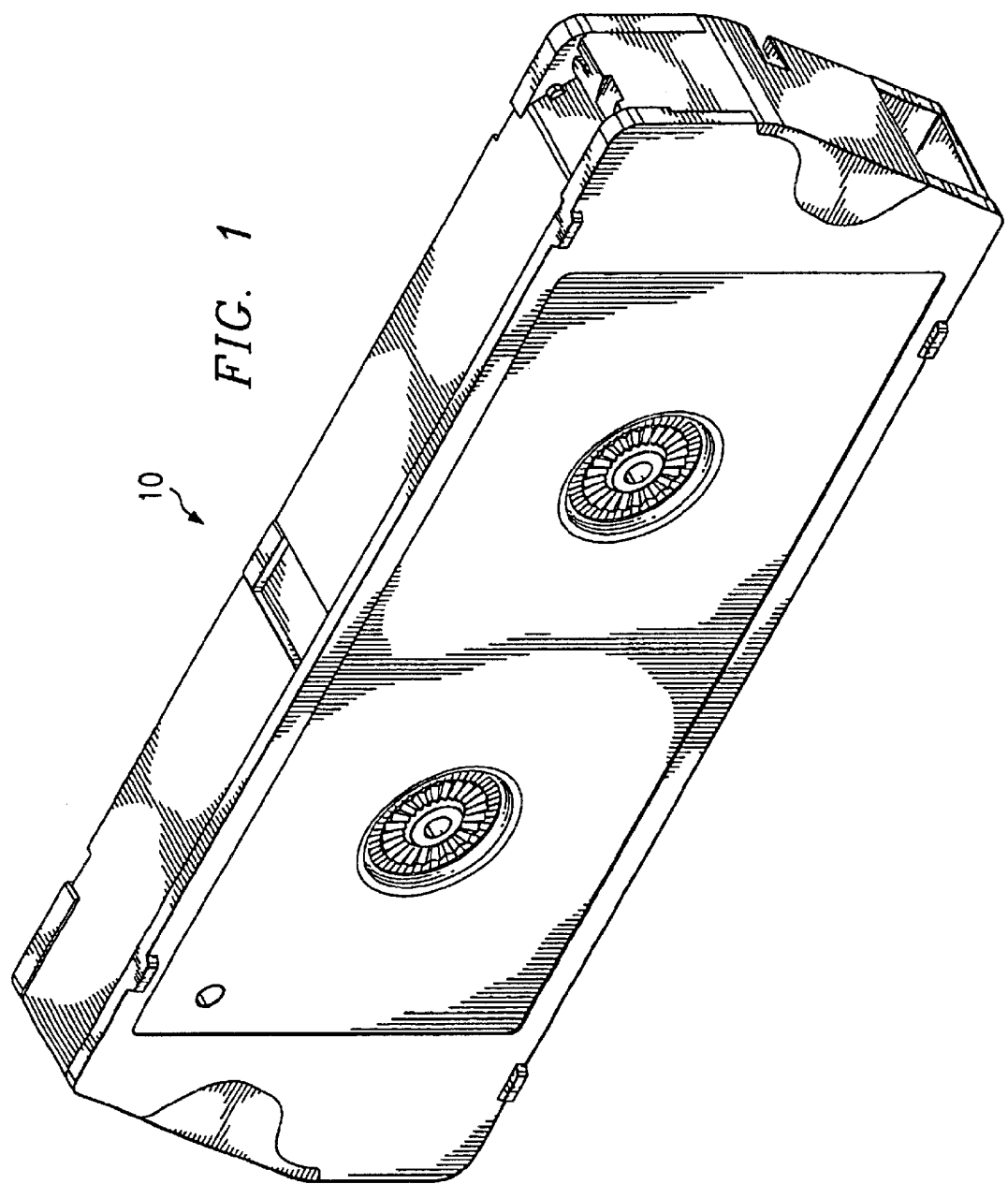
FIG. 1 is a perspective view of a dual-surface magnetic-tape cartridge according to the invention.

The heart of this invention is in the discovery that the combination of judiciously selected coercivity values in the magnetic recording layers and in the underlayers coated over a conventional tape substrate make it possible to produce thin dual-surface flexible tapes that are essentially free of print-through and contact-recording effects. Chromium dioxide possesses properties that render it suitable for this application. With the exception of the disclosed novel combinations of coercivity parameters, which have been found to be uniquely critical for implementing the invention, the physical structure and other characteristics of the dual-surface magnetic tape of the invention may be the same as those of conventional tape components. Thus, it is envisioned that the magnetic material of the invention would be applied in conventional manner to each side of a conventional tape substrate suitable for use in a magnetic tape cartridge, such as poly(ethylene terephthalate) (PET) or poly(ethylene naphthalate) (PEN).

Referring to the drawings, wherein like parts are designated throughout with like numerals and symbols, FIG. 1 illustrates a double-sided magnetic-tape cartridge 10 according to the invention. As illustrated in the partially cut-out view of FIG. 2, the cartridge 10 includes a double-sided tape 12 wound between two reels 14,16 and is equipped with two input/output doors or shutters 18,20 for access to each side of the tape by appropriate read/write heads performing input-output operations. Each opposite side of the tape 12 consists of a thin-layer coating 22,24 of high-coercivity particles, such as chromium dioxide, substantially elongated in shape and highly oriented within the layer. In order to allow a high degree of packing, the particles are preferably between 0.05 and 2.0 μm in length and between 0.005 and 0.10 μm in nominal diameter (i.e., the largest width of the dimension perpendicular to the particle's length), most preferably about 0.05-micron long and 0.005-micron wide, highly oriented and preferably with extremely narrow size distribution. While no particular size distribution has been found to be critical to the invention, tests showed that increasingly better results are achieved with narrower distributions. Under these conditions, no alumina or other wear particles normally used in the art need to be added to the magnetic layer's composition.

As a critical aspect of the invention, each magnetic layer 22,24 consists of particles with a coercivity of at least 1,500 Oe for linear-system applications and at least 2,000 Oe for helical-system applications. The magnetic layers 22,24 are coated over magnetic underlayers 26,28 that are in turn coated over a conventional substrate 30 (FIG. 3). The underlayers 26,28 are selected with a coercivity smaller than 500 Oe for linear-system applications and smaller than 800 Oe for helical-system applications. Ideally, the coercivity of each magnetic layer 22,24 should be as high as practicable based on operating parameters and cost considerations, and the coercivity of the underlayers 26,28 should be between about 25 Oe and the noted upper limit for each type of application, preferably in the 200–250 Oe range.

Chromium dioxide in ultra small particles has proven to be an excellent magnetic material with coercivity and other properties uniquely suitable for the dual-surface recording purposes of the invention. In the preferred embodiment of the invention for linear systems, 2,000–2,600 Oe chromium dioxide particles are used, each approximately 0.05 micron long and 0.005 micron wide. In the preferred embodiment of the invention for helical systems, 2,200–2,600 Oe chromium dioxide particles are used. Although not critical, particle orientation may also be used to effect the objectives of the invention. For linear-recording systems, the particle orientation should always be greater in the recording layers than in the underlayer, preferably with values greater than about 1.5:1 OR in the recording layers (most preferably with an orientation ratio greater than 3:1, possibly even as high as 4:1) and less than about 2.0:1 OR in the underlayers. For helical-recording systems, the particle orientation should be as low as possible in both types of layers, preferably lower than about 1.5:1 OR.

This material also exhibits high electrical and thermal conductivity, abrasivity, elastic modulus, particle packing, and magnetic moment at high recording densities. Thus, the effect of neighboring weak magnetic fields on the recorded signal is greatly restricted, which improves signal retention and permits coating on both sides of the magnetic tape 12. The high thermal and electrical conductivity of the material also eliminates the need for the addition of conductive fillers or the placement of a conductive backcoat or a conventional underlayer between the flexible tape substrate and the magnetic layers.

Because no wear particles (i.e., head cleaning agents such as alumina or silica) are needed, the potential for defects introduced by non-magnetic material in the coating is greatly reduced. This is especially important for narrow-track implementations. Finally, the balanced coating construction afforded by the uniform particle distribution of the magnetic layers allows stable stress relaxation, creep and guiding modeling to a degree heretofore unachievable with flexible media of particulate construction.

In the preferred embodiment of the invention, the tape 12 consists of a flexible support substrate 30 of PET or PEN coated with underlayers 26,28 approximately twice as thick as each of the magnetic layers 22,24, as illustrated in FIG. 3. Both sides of the substrate 30 are uniformly coated with substantially identical layers 26,28 and 22,24, where, based on theoretical considerations, the latter consist of chromium dioxide with a thickness ranging from 0.02 $\mu$m to 0.25 $\mu$m, preferably 0.10 to 0.20 $\mu$m. The chromium dioxide material may be deposited by conventional coating methods, such as co-extrusion, slot die, and multiple-pass gravure coating.

These combinations of particle properties and coercivity parameters made it possible to test the concept of the invention using very thin substrate and magnetic-coating layers. The invention was tested successfully in two linear-system embodiments with chromium dioxide recording layers about 0.25 $\mu$m thick with a coercivity of about 1580 Oe and 1800 Oe, respectively, and underlayers about twice as thick with a coercivity of about 200 Oe, coated over both sides of a PET substrate about 5 $\mu$m thick, for a total tape thickness of about 6.5–7.0 $\mu$m. Based on these results and the known technologies involved in producing thin substrates and magnetic layers, it is expected that the invention will enable the manufacture of flexible, dual-surface magnetic tapes with coatings as thin as 0.02 $\mu$m, thereby allowing the manufacture of flexible tapes with a total thickness in the order of a few microns.

Various changes in the details, steps and components that have been described may be made by those skilled in the art within the principles and scope of the invention herein illustrated and defined in the appended claims. For example, the material of the invention may be applied in equivalent fashion and with equivalent results to any double-sided recording medium. Therefore, while the invention has been shown and described in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

I claim:

1. A magnetic recording medium comprising:
   a support substrate;
   a first underlayer of magnetic material coated onto a first side of said support substrate;
   a second underlayer of magnetic material coated onto a second side of the support substrate;
   a first layer of magnetic material coated onto said first underlayer;
   a second layer of magnetic material coated onto said second underlayer; and
   wherein said first and second underlayers have a coercivity smaller than about 800 Oe, and said first and second layers of magnetic material have a coercivity greater than about 1,500 Oe.

2. The magnetic recording medium of claim 1, wherein the recording medium is intended for use in a linear-recording system, and each of said underlayers has a coercivity between about 25 Oe and 500 Oe.

3. The magnetic recording medium of claim 2, wherein each of said underlayers has a coercivity between about 200 Oe and 300 Oe, and said first and second layers of magnetic material have a coercivity between about 2,000 Oe and 2,600 Oe.

4. The magnetic recording medium of claim 2, wherein said magnetic material of the first and second layers is chromium dioxide in elongated particles between approximately 0.05 and 2.0 $\mu$m in length and between about 0.005 and 0.10 $\mu$m in nominal diameter.

5. The magnetic recording medium of claim 4, wherein said chromium dioxide in the first and second layers exhibits an orientation ratio less than about 1.5:1, and the orientation ratio of the underlayers is also less then about 2.0:1.

6. The magnetic recording medium of claim 1, wherein the recording medium is intended for use in a helical-recording system, and said first and second layers of magnetic material have a coercivity greater than about 2,000 Oe.

7. The magnetic recording medium of claim 6, wherein each of said underlayers has a coercivity between about 200 Oe and 300 Oe, and said first and second layers of magnetic material have a coercivity between about 2,200 Oe and 2,600 Oe.

8. The magnetic recording medium of claim 6, wherein said magnetic material of the first and second layers is chromium dioxide in elongated particles between approximately 0.05 and 2.0 $\mu$m in length and between about 0.005 and 0.10 $\mu$m in nominal diameter.

9. The magnetic recording medium of claim 1, wherein said magnetic material of the first and second layers is chromium dioxide in elongated particles between approximately 0.05 and 2.0 $\mu$m in length and between about 0.005 and 0.10 $\mu$m in nominal diameter.

10. The magnetic recording medium of claim 9, wherein said chromium dioxide in the first and second layers exhibits an orientation ratio greater than about 1.5:1; the orientation ratio of the underlayers is less than about 2.0:1; and the orientation ratio of the layers is greater than the orientation ratio of the underlayers.

11. The magnetic recording medium of claim 1, wherein said first and second layers of magnetic material have a thickness ranging between 0.02 $\mu$m and 0.25 $\mu$m.

12. The magnetic recording medium of claim 11, wherein said first and second layers of magnetic material have a thickness ranging between 0.10 and 0.20 $\mu$m.

13. The magnetic recording medium of claim 11, wherein said first and second underlayers have a thickness about twice as large as said thickness of the first arid second layers of magnetic material.

14. A magnetic recording cartridge comprising:
   (a) a housing;
   (b) a dual-surface flexible magnetic tape contained within the housing, said tape including:
      a support substrate;
      a first underlayer of magnetic material coated onto a first side of said support substrate;
      a second underlayer of magnetic material coated onto a second side of the support substrate;
      a first layer of magnetic material coated onto said first underlayer; and
      a second layer of magnetic material coated onto said second underlayer; and
   (c) means for enabling read/write operations on said tape;
   wherein said first and second underlayers have a coercivity smaller than about 800 Oe, and said first and second layers of magnetic material have a coercivity greater than about 1,500 Oe.

15. The magnetic recording cartridge of claim 14, wherein the recording cartridge is intended for use in a linear-recording system, and each of said underlayers has a coercivity between about 25 Oe and 500 Oe.

16. The magnetic recording cartridge of claim 15, wherein each of said underlayers has a coercivity between about 200 Oe and 300 Oe, and said first and second layers of magnetic material have a coercivity between about 2,000 Oe and 2,600 Oe.

17. The magnetic recording cartridge of claim 15, wherein said magnetic material of the first and second layers is chromium dioxide in elongated particles between approximately 0.05 and 2.0 μm in length and between about 0.005 and 0.10 μm in nominal diameter.

18. The magnetic recording cartridge of claim 14, wherein the recording cartridge is intended for use in a helical-recording system, and said first arid second layers of magnetic material have a coercivity greater than about 2,000 Oe.

19. The magnetic recording cartridge of claim 18, wherein each of said underlayers has a coercivity between about 200 Oe and 300 Oe, and said first and second layers of magnetic material have a coercivity between about 2,200 Oe and 2,600 Oe.

20. The magnetic recording cartridge of claim 18, wherein said magnetic material of the first and second layers is chromium dioxide in elongated particles between approximately 0.05 and 2.0 μm in length and between about 0.005 and 0.10 μm in nominal diameter.

21. The magnetic recording cartridge of claim 20, wherein said chromium dioxide exhibits orientation ratios less than about 1.5:1.

22. The magnetic recording cartridge of claim 14, wherein said magnetic material of the first and second layers is chromium dioxide in elongated particles between approximately 0.05 and 2.0 μm in length and between about 0.005 and 0.10 μm in nominal diameter.

23. The magnetic recording cartridge of claim 22, wherein said chromium dioxide in the first and second layers exhibits an orientation ratio greater than about 1.5:1; the orientation ratio of the underlayers is less then about 2.0:1; and the orientation ratio of the layers is greater than the orientation ratio of the underlayers.

24. The magnetic recording cartridge of claim 14, wherein said first and second layers of magnetic material have a thickness ranging between 0.02 μm and 0.25 μm.

25. The magnetic recording cartridge of claim 24, wherein said first and second underlayers have a thickness about twice as large as said thickness of the first and second layers of magnetic material.

26. The magnetic recording cartridge of claim 14, wherein said first and second layers of magnetic material have a thickness ranging between 0.10 and 0.20 μm.

* * * * *

UNITED STATES PATENT AND TRADEMARK OFFICE
CERTIFICATE OF CORRECTION

PATENT NO. : 6,890,631 B2  
APPLICATION NO. : 10/167155  
DATED : May 10, 2005  
INVENTOR(S) : Richard Lionel Bradshaw It is certified that error appears in the above-identified patent and that said Letters Patent is hereby corrected as shown below:

Column 6, Line 36, Claim 13, replace "arid" with --and--

Column 7, Line 5, Claim 18, replace "arid" with --and--

Signed and Sealed this

Fifteenth Day of August, 2006

JON W. DUDAS  
*Director of the United States Patent and Trademark Office*

UNITED STATES PATENT AND TRADEMARK OFFICE
CERTIFICATE OF CORRECTION

| | | |
|---|---|---|
| PATENT NO. | : 6,890,631 B2 | |
| APPLICATION NO. | : 10/167155 | |
| DATED | : May 10, 2005 | |
| INVENTOR(S) | : Richard Lionel Bradshaw | |

It is certified that error appears in the above-identified patent and that said Letters Patent is hereby corrected as shown below:

Column 6, Line 36, Claim 13, replace "arid" with --and--

Column 7, Line 5, Claim 18, replace "arid" with --and--

Signed and Sealed this

Ninth Day of December, 2008

JON W. DUDAS
*Director of the United States Patent and Trademark Office*